US006989772B2

(12) United States Patent
Barlow

(10) Patent No.: US 6,989,772 B2
(45) Date of Patent: Jan. 24, 2006

(54) KEYBOARD APPARATUS AND METHOD FOR ENHANCED DATA ENTRY CAPABILITY

(76) Inventor: Roger Barlow, 3613 NE. 2nd St., Center Point, AL (US) 35215

( * ) Notice: Subject to any disclaimer, the term of this patent is extended or adjusted under 35 U.S.C. 154(b) by 0 days.

(21) Appl. No.: 10/678,854

(22) Filed: Oct. 3, 2003

(65) Prior Publication Data

US 2005/0073445 A1    Apr. 7, 2005

(51) Int. Cl.
     *H03M 11/00*    (2006.01)
(52) U.S. Cl. ................ 341/20; 400/489; 400/486; 400/472
(58) Field of Classification Search ............. 341/20, 341/22; 400/486, 489, 472
See application file for complete search history.

(56) References Cited

U.S. PATENT DOCUMENTS 5,336,002 A * 8/1994 Russo ................... 400/489
5,476,332 A * 12/1995 Cleveland, Jr. .......... 400/486
6,102,594 A * 8/2000 Strøm .................... 400/486
6,142,687 A * 11/2000 Lisak ..................... 400/472
6,558,056 B2 * 5/2003 Euley et al. ............. 400/489
6,712,535 B2 * 3/2004 McLoone et al. ........ 400/489
6,771,191 B2 * 8/2004 Motoe ...................... 341/22

* cited by examiner

*Primary Examiner*—Albert K. Wong
(74) *Attorney, Agent, or Firm*—Jeffrey Weiss; Harry M. Weiss; Weiss, Moy & Harris, P.C.

(57) ABSTRACT

An enhanced data entry keyboard apparatus and method positions a tab key proximate the numeric keyboard section of a computer keyboard, so that a user may depress the tab key with the same hand that is being used to operate the numeric keyboard, without moving that hand from the area of the numeric keyboard. In one embodiment, a toggle key is provided to permit the toggling of a second key, preferably the "enter" key located in the lowest right-hand corner of a typical keyboard, between its default function and a "tab" function. A status indicator light may be provided to indicate that toggling has occurred.

1 Claim, 6 Drawing Sheets

KEYBOARD APPARATUS AND METHOD FOR ENHANCED DATA ENTRY CAPABILITY

FIELD OF THE INVENTION

This invention relates generally to computer keyboards and, more specifically, to a keyboard apparatus and method that provides enhanced data entry capability by changing the functionality of an "enter" key from "enter" to "tab."

BACKGROUND OF THE INVENTION

During the process of entering data into a computer program having multiple data entry fields, users often find that their speed of data input is limited by the sequence of the keystrokes that are required to complete a particular data entry task. In this regard, typically, to move from one data entry field to another, the user must either depress the "tab" key, or use the mouse to "click" in the next data entry box. This requires the user to either keep both hands on the keyboard to efficiently move among data entry fields, or to constantly leave the keyboard to find the mouse.

This problem occurs in all types of software programs, and is particularly acute with respect to those requiring the entry of large amounts of numerical data, such as are utilized in the accounting field. In this regard, users who are required to enter large amounts of numerical data for an accounting purpose often prefer to use the right hand to do so, utilizing the numeric keypad that is typically located on the right side of the keyboard. (See, e.g., FIG. 1). This frees the left hand to manipulate documents from which the user may be obtaining data for entry. In order to change data fields, such a person must move the right hand across the keyboard to locate the "tab" key that is commonly on the far left side (see FIG. 1), remove the right from the numeric keyboard to locate and manipulate the mouse, or use the left hand to depress the "tab" key (making it temporarily unavailable for document manipulation). Each of these options slows the data entry process and reduces user efficiency.

A need therefore existed for a keyboard apparatus and method that would permit a user to depress a "tab" key proximate the numeric keyboard located on the right side of the keyboard, so that a user may do so without removing his or her hand from the area of the numeric keyboard. The present invention satisfies this need and provides other, related, advantages.

SUMMARY OF THE INVENTION

In one embodiment, an enhanced data entry keyboard apparatus is provided. It comprises a "tab" key located in proximity to the numeric keyboard section of a keyboard, so that a user may depress the "tab" key without the user moving his or her first hand from the numeric keyboard section when depressing the tab key with the first hand.

In another embodiment, an enhanced data entry keyboard apparatus is provided. It comprises, in combination: a first key; and a second key located proximate the numeric keyboard section; wherein depression of the first key causes the second key to toggle between a default function and a tab function.

In still another embodiment, a method for enhanced data entry is provided. It comprises the steps of: a user moving from a first data entry box to a second data entry box on a computer screen by depressing a tab key located in proximity to the numeric keyboard section of a keyboard, without the user moving his or her first hand from the numeric keyboard section when depressing the tab key with the first hand.

DETAILED DESCRIPTION OF THE PREFERRED EMBODIMENTS

Figure 1:
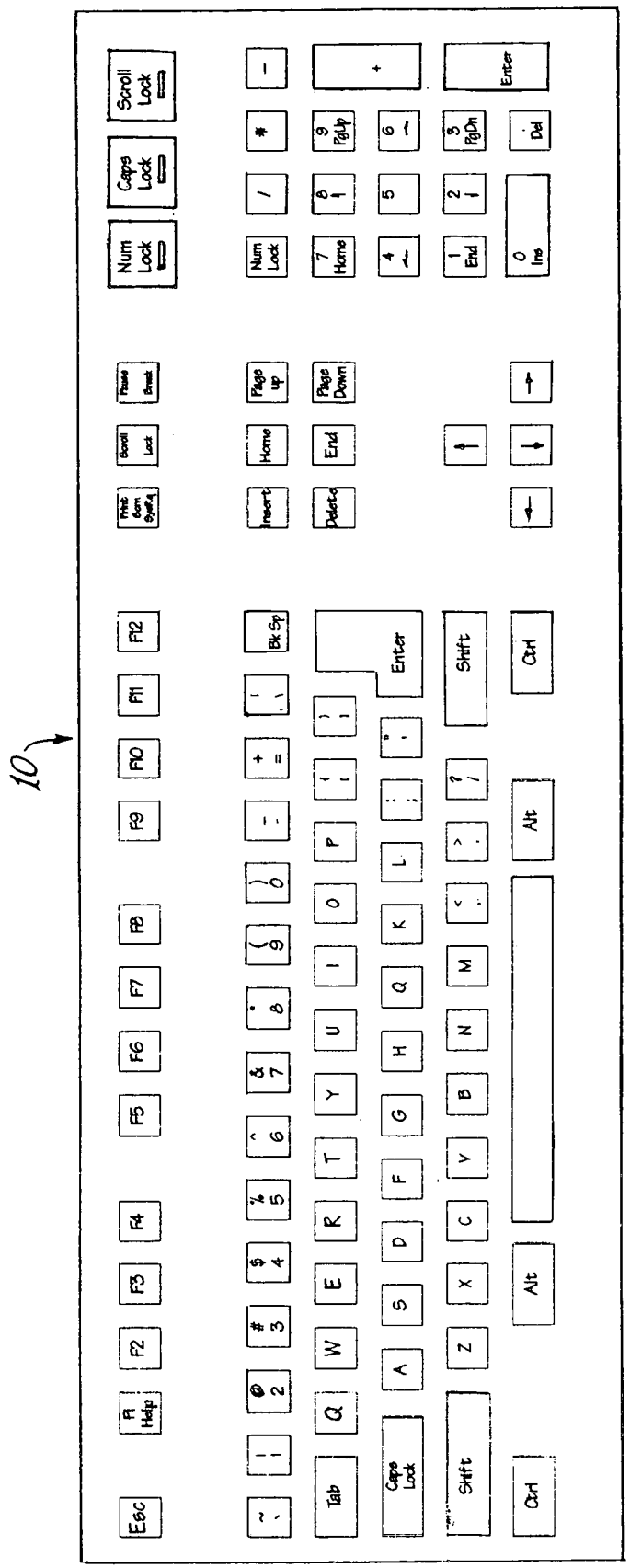
FIG. 1 is a top view showing the layout of a keyboard consistent with an embodiment of the present invention.

Referring first to FIG. 1, the layout of a first keyboard 10 is shown. The layout of the keyboard 10 is identical to that of many prior art keyboards. Accordingly, in this embodiment, no additional keys are added to a prior art keyboard. Instead, the internal configuration and programming of the keyboard 10 is altered so that the depression of a first key, such as one of the "shift" keys, for example, changes the functionality of a key proximate the numeric keyboard, such as the "enter" key in the lowest right hand corner, so that it now acts as a "tab" key.

In this embodiment, the first key (e.g., "shift") acts to toggle the action of the second (e.g., "enter"), between a default function and a "tab" function. In the default state, the second key functions normally. Thus, if the second key is an "enter" key, it will perform its typical "enter" function when depressed in its default setting. When toggled, depression of the second key will perform the "tab" function. The second key continues to act as a "tab" key, until toggled back to its default condition by a second depression of the first key in combination with the second.

Figure 2:
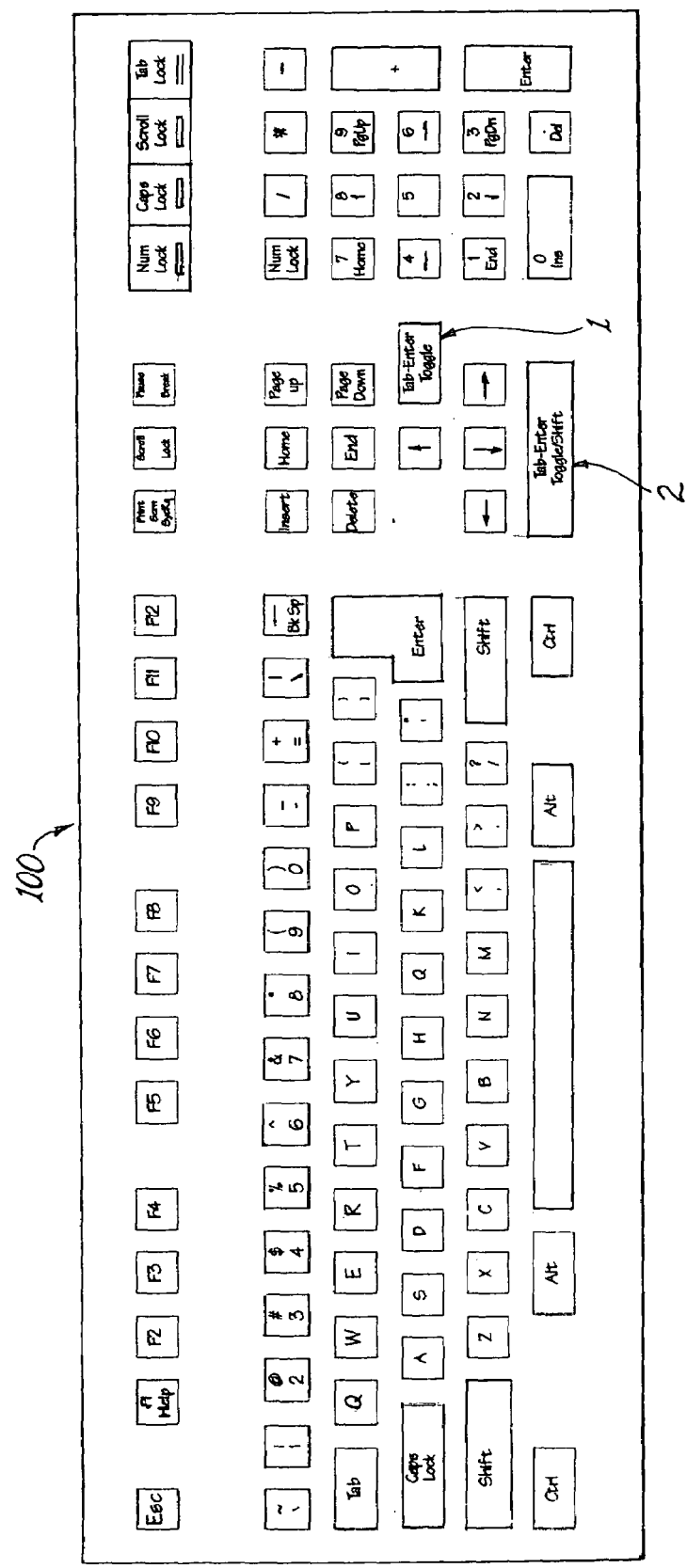
FIG. 2 is a top view showing the layout of a keyboard consistent with another embodiment of the present invention.

Referring now to FIG. 2, the layout of a second keyboard 100 is shown. In this embodiment, a tab-enter toggle key 1 has been added to the keyboard, proximate the numeric keyboard. Preferably, in addition, a tab lock status indicator light 3 is also added, in the area of the other status indicator lights. In this embodiment, depression of the tab-enter toggle key 1 toggles the functionality of a second key, preferably the "enter" key in the lowest right hand corner, between a default function (e.g., "enter") and the "tab" function. A second depression of the tab-enter toggle key 1 causes the second key to revert to its default function. In the event that the tab lock status indicator light 3 is provided, it should illuminate following depression of the tab-enter toggle key 1, to indicate that the "tab" function has been selected for the second key. It should be noted that it would be possible to provide the tab-enter toggle key 1 without also providing the tab lock status indicator light 3.

Still referring to FIG. 2, a tab-enter toggle/shift key 2 may be provided, in addition to or in place of the tab-enter toggle key 1. The tab-enter toggle/shift key 2 acts in the following manner. When depressed and released (i.e., tapped), it toggles the function of the second key between its default function and its "tab" function. When held down, it acts as a "shift" key, causing the second key to temporarily function as a "tab" key until the release of the tab-enter toggle/shift key 2, at which time the second key reverts to its default function.

Figure 3:
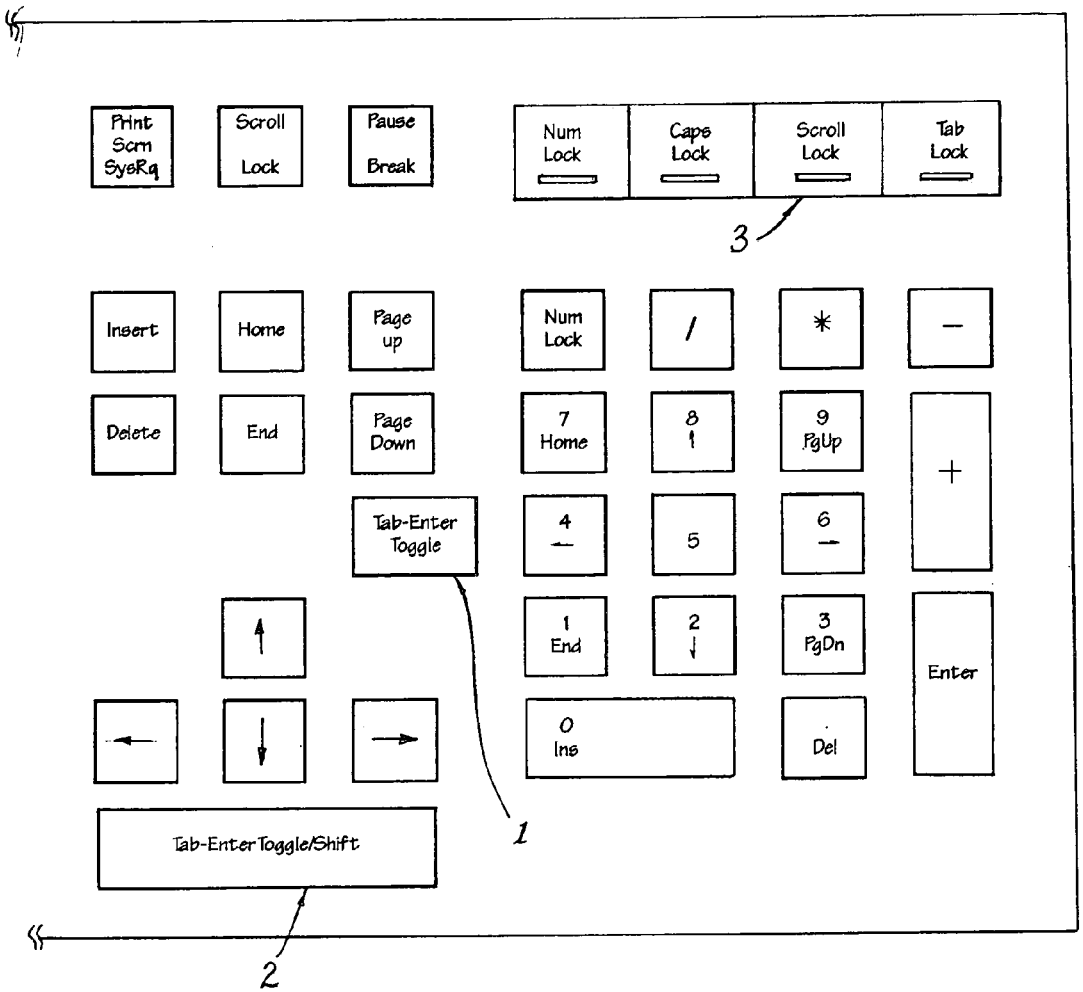
FIG. 3 is a top view showing the numeric keyboard area of the keyboard of FIG. 2.

FIG. 3 shows the numeric keyboard portion of second keyboard 100. It should be noted that the precise location of the tab-enter toggle key 1, tab-enter toggle/shift key 2, and tab lock status indicator light 3 can be varied. In determining precise key location, the preference is to locate at least the tab-enter toggle key 1 and/or tab-enter toggle/shift key 2 in close proximity to the numeric keyboard, so as to permit their activation by the same hand that is operating the numeric keyboard with a minimum of disruption.

Figure 4:
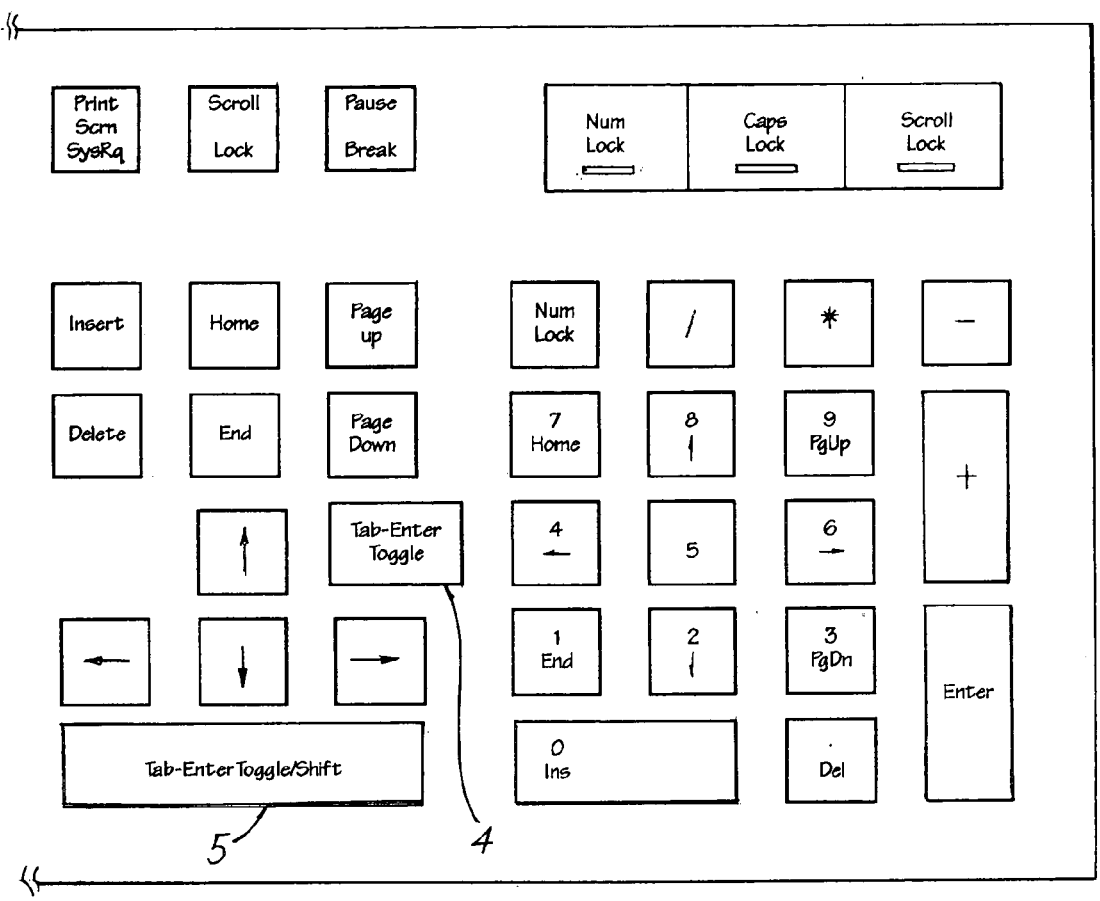
FIG. 4 is a top view showing the numeric keyboard area of a keyboard consistent with another embodiment of the present invention.

Referring now to FIG. 4, in this embodiment, the status light is made integral to the toggle key(s) provided. Accordingly, the tab-enter toggle key 4, which has the functionality described above with respect to the tab-enter toggle 1, will have its integral status light illuminate upon the toggling of the functionality of the second key to "tab." If provided, the tab-enter toggle/shift key 5, which has the functionality described above with respect to the tab-enter toggle/shift key 2, will have its integral status light illuminate upon the toggling of the functionality of the second key to "tab."

Figure 5:
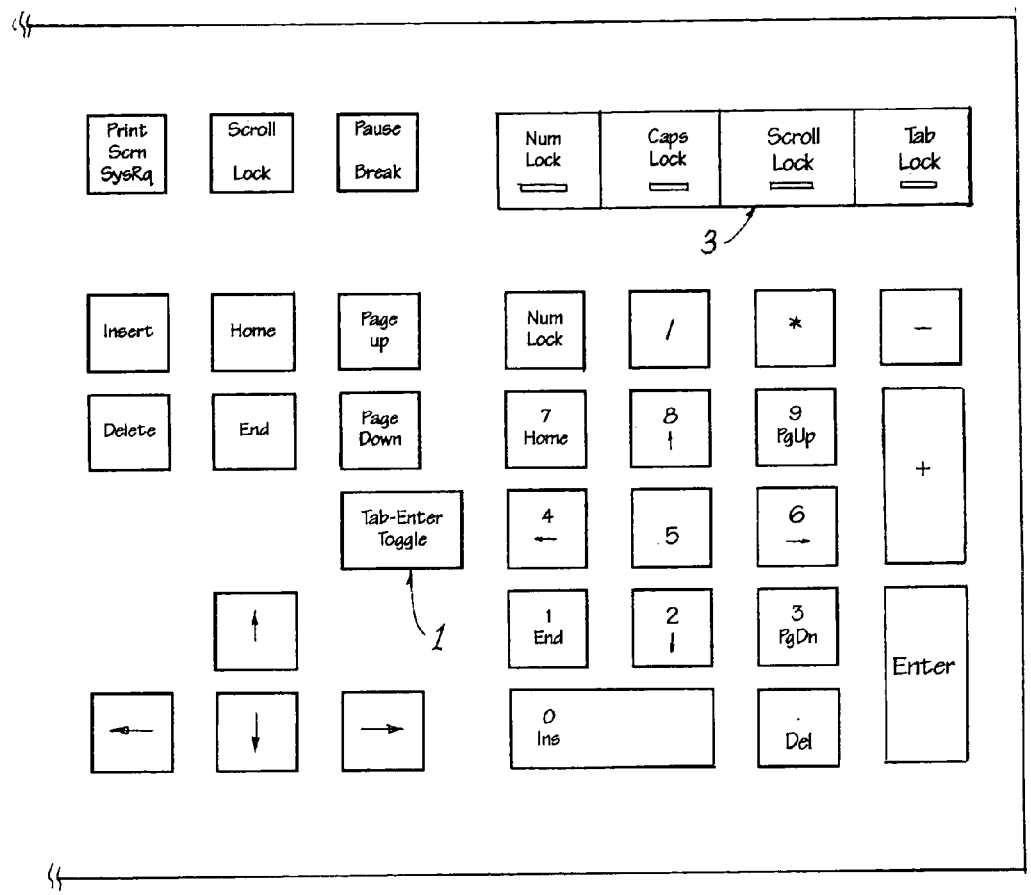
FIG. 5 is a top view showing the numeric keyboard area of a keyboard consistent with another embodiment of the present invention.
Figure 6:
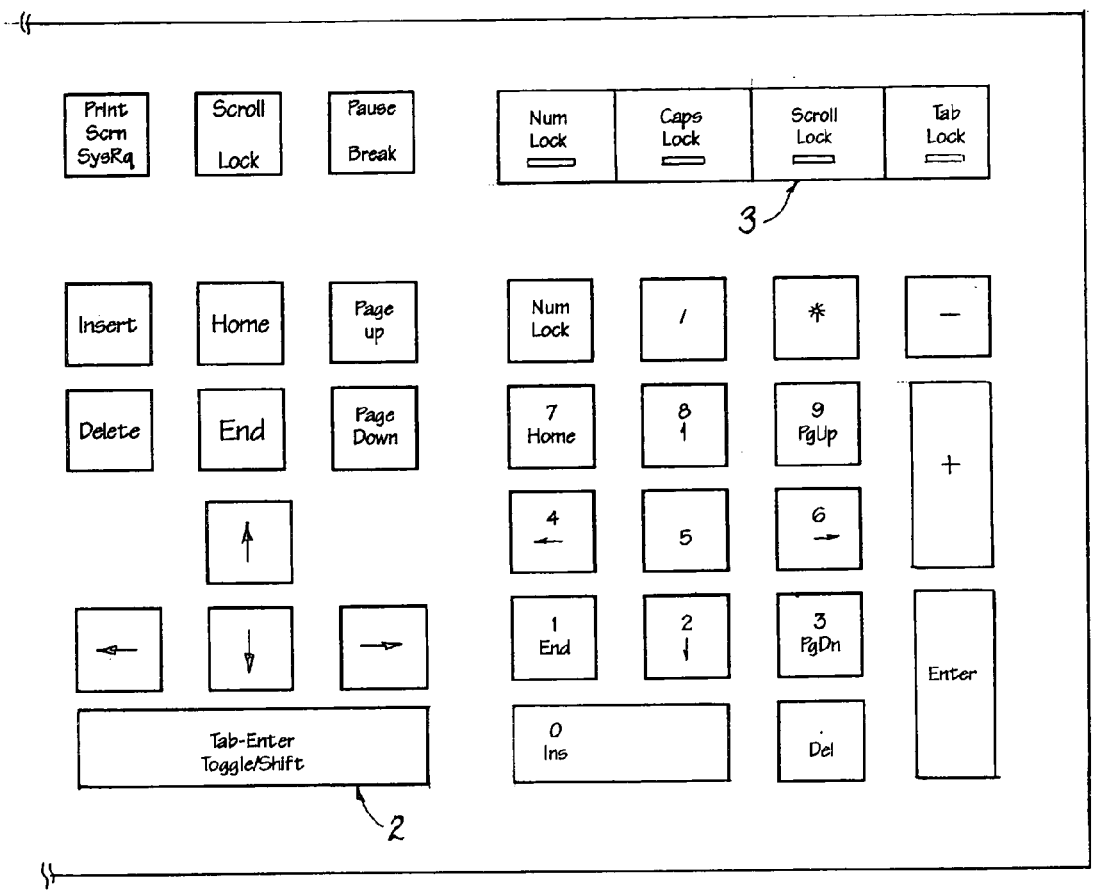
FIG. 6 is a top view showing the numeric keyboard area of a keyboard consistent with another embodiment of the present invention.

Referring now to FIG. 5, in this embodiment, the tab-enter toggle key 1 is provided, together with the tab status indicator light 3. No tab-enter toggle/shift key is provided in this embodiment. Referring now to FIG. 6, in this embodiment the tab-enter toggle key 2 is provided, together with the tab status indicator light 3. No tab-enter toggle key is provided in this embodiment.

While the invention has been particularly shown and described with reference to preferred embodiments thereof, it will be understood by those skilled in the art that the foregoing and other changes in form and details may be made therein without departing from the spirit and scope of the invention.

I claim:

1. An enhanced data entry keyboard apparatus comprising:
   a keyboard having an alphabetic keyboard section and to the side thereof a dedicated numeric keyboard section;
   a single function "tab" key located in proximity to said dedicated numeric keyboard section of said keyboard, so that a user may depress the "tab" key without said user moving his or her first hand from said dedicated numeric keyboard section when depressing said "tab" key with said first hand, the fingers of the first hand moving only between the "tab" key and the dedicated numeric keyboard section for numerical data entry into data fields.

* * * * *